United States Patent [19]

Perry

[11] 4,223,692

[45] Sep. 23, 1980

[54] RECREATIONAL VEHICLE SAFETY SYSTEM

[76] Inventor: Landis H. Perry, 1028 Monada Pl., Altadena, Calif. 91001

[21] Appl. No.: 843,455

[22] Filed: Oct. 19, 1977

[51] Int. Cl.$^2$ .................. F16K 17/30; F16K 31/06; F17D 5/02; G08B 17/10

[52] U.S. Cl. .................. 137/78.4; 137/460; 137/461; 137/495; 137/554; 137/557; 251/140; 340/634

[58] Field of Search .................. 137/78, 344, 460, 495, 137/498, 461, 517; 340/626, 634; 251/140

[56] References Cited

U.S. PATENT DOCUMENTS

| | | | |
|---|---|---|---|
| 2,067,622 | 1/1937 | Smith | 137/461 |
| 2,245,271 | 6/1941 | Guill | 137/498 X |
| 3,407,827 | 10/1968 | Follett | 137/460 X |
| 3,750,693 | 8/1973 | Hardison | 251/129 X |
| 3,955,186 | 5/1976 | Green et al. | 340/634 X |

FOREIGN PATENT DOCUMENTS

| | | | |
|---|---|---|---|
| 48208 | 1/1914 | Sweden | 137/505.12 |
| 366308 | 1/1973 | U.S.S.R. | 137/554 |

Primary Examiner—Alan Cohan
Assistant Examiner—Richard Gerard
Attorney, Agent, or Firm—Jackson, Jones & Price

[57] ABSTRACT

A recreational vehicle safety system includes two independently operable automatic shutoff valve assemblies. One valve assembly is attached directly to the recreational vehicle's appliance high-pressure fuel tank in such a manner as to be operable in all conceivable crash situations, and the other is connected downstream from the appliance fuel line's high-pressure regulator and is designed to close off the fuel flow when a fuel line breaks or small gas leaks are present, such as when an appliance pilot light goes out. Provided also with these valve assemblies are a gas sensor and warning light and audible alarms located about the recreational vehicle to alert campers to potentially dangerous malfunctions. Electrical and manual resets are provided for the safety system, so that the recreational vehicle's appliances can be made operable again if a malfunction occurs in the wilderness, remote from needed tools and expert mechanical assistance.

27 Claims, 9 Drawing Figures

RECREATIONAL VEHICLE SAFETY SYSTEM

BACKGROUND OF THE INVENTION

1. Field of the Invention

The present invention relates to a recreational vehicle safety system for use in conjunction with a recreational vehicle's fuel supply to its appliances and more particularly to an automatic shutoff valve assembly and sensor to automatically shutoff the flow of fuel to the appliances if certain abnormal conditions are present in the recreational vehicle.

2. Brief Description of the Prior Art

Recreational vehicles, better known to some as campers, began appearing on the American highways in the 1950's. From their inception, Americans became fond of these vehicles and they have become increasingly apparent on our highways since the late 1960's.

In their infancy, recreational vehicles were crude devices, simply tents erectable over a portable carriage which hooked onto the rear of the standard American automobile. However, over the years they have been refined. Now they include their own engines, separate passenger compartments and especially their own appliances, such as stoves, refrigerators and hot water heaters. These appliances are usually powered by gas, supplied in portable high-pressure propane tanks.

With these new recreational vehicle advances have also come increasingly apparent safety problems, especially related to the fuel supply to the appliances. During a crash, a high-pressure propane tank can be torn from the vehicle to spray highly flamable gas onto the recreational vehicle. Another potential problem is that the pilot light in the stove can go out and gas can leak into the camper while the passengers sleep. If there is a slow leak in the fuel line and a vacationer enters with a lit cigarette, the recreational vehicle can blow up.

The valving art, per se, includes many automatic shutoff valves of various types and designs which can automatically shutoff the flow of liquid or gas in a pipe when certain conditions are detected, usually when a downstream pipe has ruptured and the flow must be stopped.

Additionally, prior automatic shutoff valves generally provide no indication that they have been engaged other than the flow from the pipe has stopped. But, in a recreational vehicle safety system it is essential to know when the automatic valve has been engaged so that the proper warning signals can be given to alert the passengers.

Finally, prior automatic shutoff valves have provided relatively cumbersome reset mechanisms when an external reset was deemed necessary. These reset mechanisms have included the dismantling of the valve itself. But a recreational vehicle is sometimes located far in the wilderness, remote from needed tools and expert mechanical assistance. Therefore, if the temporary problem can be solved, it would be highly desirable to include easily operated resets.

To date, no known prior art has met the requirements peculiar to the needs of a recreational vehicle safety system.

U.S. Pat. Nos. of general interest are H. F. Storer, et. al, 1,013,695; D. Magowan, Jr., 2,929,399; J. F. Machen, 3,106,226; J. L. Follett, 3,407,827; Bauer, 3,661,173; Sweeney, 3,664,368; and Sumner et al., 3,807,442.

SUMMARY OF THE INVENTION

Therefore, it is an object of the present invention to fulfill the special requirements for a recreational vehicle safety system. One of these objects is to provide a first automatic shutoff valve assembly so located on the recreational vehicle's high-pressure fuel tank that it will remain operable throughout all conceivable conditions, including crashes and fires, and provide the additional capability of preventing the high-pressure tank from exploding in the presence of excessive heat by occasionally relieving internal pressure even after the high-pressure tank has been automatically shut off.

It is a further object of the present invention to provide an easy mechanical reset mechanism to be used in conjunction with this high-pressure automatic shutoff valve.

It is a further object of the present invention to provide a second automatic shutoff valve assembly and gas sensor downstream from the high-pressure regulator which will shut off flow in the fuel line whenever abnormal conditions in the fuel line or in the recreational vehicle are detected. Such detectable abnormal conditions can include a malfunction in the high-pressure regulator, a fuel line rupture, a slow fuel leak especially when a pilot light goes out in an appliance, excessive carbon monoxide from the recreational vehicle's engine and smoke and fire.

It is a further object of the present invention to provide warning lights and audible alarms to signal the passengers of the recreational vehicle that the automatic valve assembly has operated to indicate that there has been a malfunction in the appliance fuel system which could be dangerous.

It is a further object of the present invention to provide for a switch operated electrical reset for the second automatic shutoff valve assembly.

Features of this recreational vehicle safety system which are believed to be novel are set forth with particularity in the appended claims. The present invention both as to its organization and manner of operation together with further objects and advantages thereof will be further disclosed in the following detailed description of the preferred embodiment when taken in conjunction with the accompanying drawings.

DESCRIPTION OF THE PREFERRED EMBODIMENT

The following description is provided to enable any person of ordinary skill in the field of recreational vehicles to install and use the described recreational vehicle safety system as it is set forth herein. The embodiment of the invention disclosed herein is the best mode contemplated by the inventor of carrying his invention into practice. Various modifications, however, will remain readily apparent to those skilled in the above art since the generic principles of the present invention can be applied to provide other forms of the applicable safety system.

Figure 1:
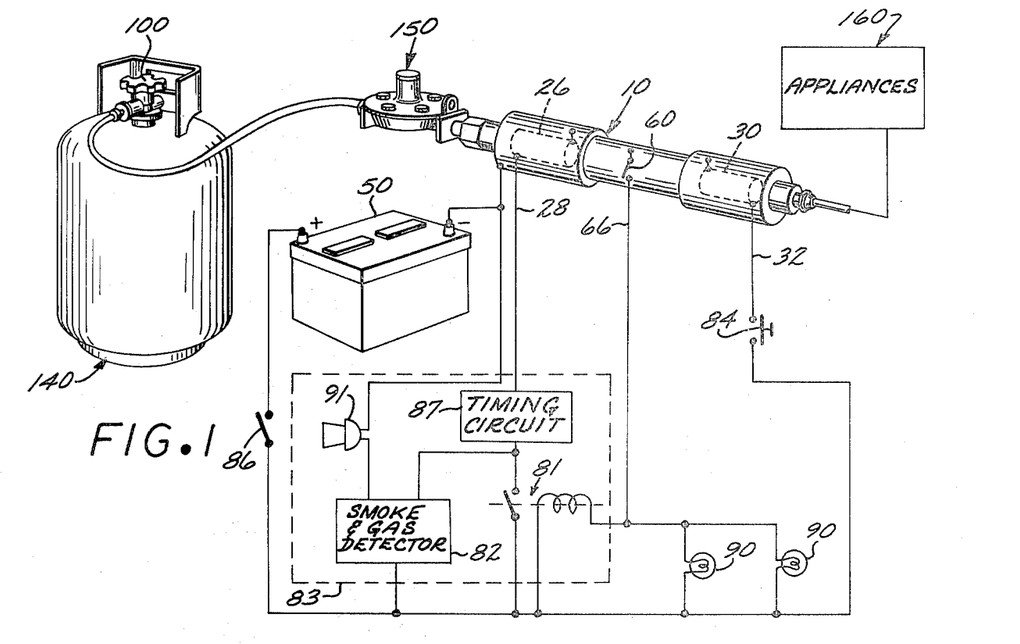
FIG. 1 is a schematic of the entire recreational vehicle safety system including the high-pressure fuel tank, its related valve assemblies, gas detector, appliances, and electrical circuit.

Referring to FIG. 1, a schematic of the recreational vehicle safety system of the present invention is disclosed to assist in understanding the advantage of the present invention. It should be fully realized the schematic is not drawn to scale and the various component parts making up the schematic can be positioned both on the exterior and on the interior of the recreational vehicle. For example, the propane fuel tank 140 that is generally utilized in recreational vehicles is usually mounted on the exterior of the vehicle and in the case of a towed vehicle is frequently mounted above the towing bar in the front of the towed camper. The smoke and gas detector or sensors 82 would be mounted within the interior of the recreational vehicle along with the appliances 160. Lights or visual indicators 90 can be mounted both on the exterior and the interior of the recreational vehicle and additionally can be mounted in a cab compartment or in an independent vehicle that is towing the camper to warn the driver.

Referring to FIG. 1, a tank 140 of a conventional design will usually be mounted on the exterior of the recreational vehicle. Attached to and within the tank 140 will be a first automatic valve shutoff assembly 100 that will be subsequently described herein. Connected in the fuel line downstream of the first shutoff valve assembly 100 is a conventional high-pressure regulator 150 which is set to maintain a desired constant downstream pressure level regardless of the amount of fuel, such as propane, in the tank 140. The use of a high-pressure regulator is conventional and accordingly it is not necessary to describe the specific details herein.

Further, connected downstream from the high-pressure regulator 150 is the second automatic shutoff valve assembly 10. This portion of the recreational vehicle safety system is capable of operating independently of the first automatic shutoff valve assembly 100 and thereby provides an important supplemental safety feature.

The second automatic shutoff valve assembly 10 is operatively connected to a smoke and gas detector 82 and various visual and audio warning signals which will be described subsequently herein. An appropriate gas and fume sensor can be of the type sold by the Pitco Company Model 212G, Santa Ana, Calif., and accordingly the specific constructional details need not be described herein.

The sensor 82 has the capability of detecting butane, propane, carbon monoxide, natural gas, gasoline vapor and other oxidizable gases and of producing an audible alarm at a relatively low level of concentration substantially below the flash point.

The sensor 82 can incorporate a hot filament surface barrier semiconductor device whose resistance will increase linearly with increasing gas concentration. A regulatory circuit insures that a constant direct current voltage is applied across the filament surface, thus isolating it from any vehicular battery voltage changes. The sensor 82 is capable of generating external signals indicating a gas concentration of at least 1000 ppm to drive any audio or visual alarm.

Finally, connected downstream from the second automatic shutoff valve 10 are the recreational vehicle appliances 160.

Figure 2:
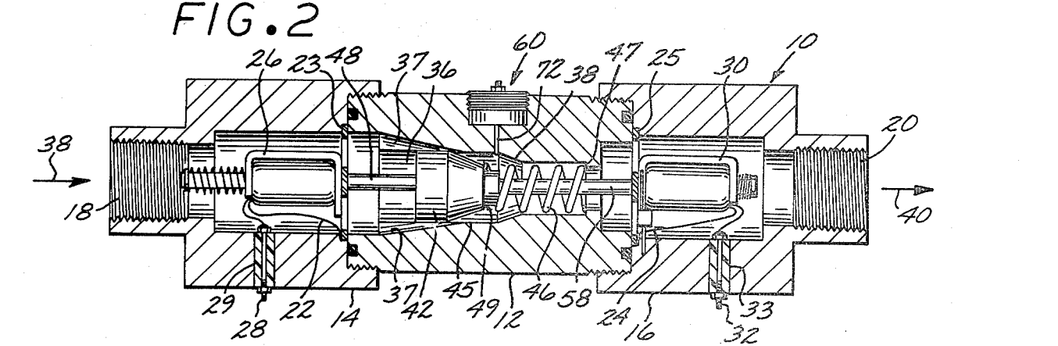
FIG. 2 is a cross-sectional view of the second automatic shutoff valve assembly with its valve member in an open position.

Referring now to the cross-sectional view of FIG. 2, the second automatic flow shutoff valve assembly 10 has a housing member which is comprised of a body member 12 upon which two end caps 14 and 16 are sealably attached. Other configurations of the valve housing could be utilized.

Fuel enters the valve assembly 10 from the fuel line as shown by arrow 38. The flow is into an axial passageway 18 of cap 14. Cap 14 itself will have various types of conventional means for coupling to fuel lines which need not be disclosed herein.

Fuel flows from this passageway 18 into passageway 36 located in the body member 12 and from there into passageway 20 located in cap 16. Cap 16 also has similar conventional means the same as cap 14 for coupling to fuel lines. Fuel will then flow from the valve assembly 10 into the fuel line as indicated by arrow 40.

Two explosion proof conventional solenoids 26 and 30 are mounted within the axial passageways of valve assembly 10. The solenoids 26 and 30 can be of the type sold as Mini-Solenoid Actuators which can be purchased from Electro-Mechanisms, Inc., P.O. Box A, Azusa, Calif. 91702. One of the solenoids 26, is cantilever mounted within cap 14 by a mounting ring 23, and is used to drive a valve plug member 42 against a conical valve seat 38 when any abnormal condition is detected by the safety system. Solenoid 26 has a connector wire 28 extending through cap 14 in a nonconducting sheath 29 to act as one electrical lead to the solenoid 26. The other lead 22 to the solenoid 26 is grounded to the valve assembly 10.

The second solenoid 30 is also cantilever mounted in cap 16 by a second mounting ring 25. This solenoid 30 can drive the valve member 42 away from its valve seat 38 when an electrical reset 84, as shown in FIG. 1, is manually activated to reset the safety system. The solenoid 30 has a connector wire 32 extending through cap 16 in a nonconducting sheath 33. This wire acts as one electrical lead to solenoid 30. The other lead 24 is grounded to the valve assembly 10.

In order to understand how the automatic valve assembly 10 operates, reference is made to passageway 36 located in the body member 12. This flow passageway has a circular cross section with a uniform diameter somewhat smaller than the diameter of the axial passageways 18 and 20. Its function is to act as a fluid conduit and guide for the valve plug member 42. Valve plug member 42 is of approximately the same diameter as passageway 36 and is also circular in cross section. Preferably the valve plug 42 is formed of a plastic material that is inert to the fluid. Since axial passageway 36 is of nearly the same diameter as valve plug member 42, almost no fuel would flow through the central portion of the valve assembly 10 were it not for four louvers or channels 37 (two of which are shown by arrow 37) arranged about passageway 36 and spaced 90° from each other. These louvers 37 are conical in shape and interface with passageway 18 in the preferred embodiment. They may be, however, semi-cylindrical in shape to point 45 in passageway 36. These conical louvers 37 narrow in the downstream direction; that is, the radial height from central axis of valve 10 decreases until they become flush with the surface of passageway 36 at a point shown by arrow 45. Thus, fuel can flow through the louvers 37 past valve member 42 and into passageway 36 at point 45. Alternatively, the axial passageway 36 can be enlarged and alignment extensions (not shown) be placed on the plug member 42.

Valve plug member 42 is biased away from its valve seat 38 by a relatively small spring force spring 46 which is mounted at one end on an annular shoulder 47 in the axial passageway 36 and at the other end against an annular shoulder 49 located on valve plug 42. By selecting a spring force of an appropriate value, the valve assembly 10 can be made to shut off when a sufficient predetermined abnormal pressure differential occurs between the upstream entrance 18 and downstream exit 20 to valve assembly 10. It is the force of this abnormal pressure differential which drives the valve plug member 42 in the downstream direction toward its valve seat 38 against the resistance of spring 46.

Figure 3:
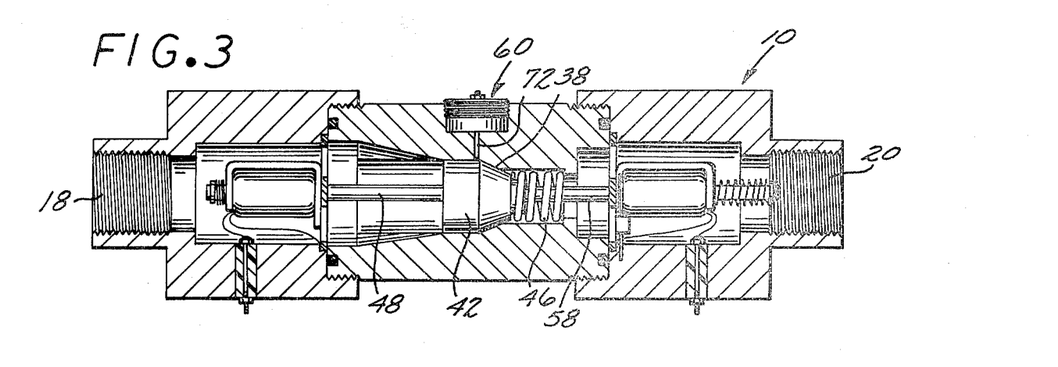
FIG. 3 is a cross-sectional view of the second automatic shutoff valve assembly with its valve member in a closed position.

Referring to FIG. 3, the valve plug member 42 is shown in contact with its valve seat 38. This means an abnormal condition has been detected such as a break in the downstream fuel line to produce a sufficient pressure differential to drive valve plug member 42 against its valve seat 38 or a sensing of gas. In this configuration, solenoid 26 has been sequentially automatically activated by a short duration current pulse to further drive the valve plug member 42 against the seat 38. The valve plug member 42 will remain firmly seated because of the pressure differential now existing between the upstream and downstream ends of valve assembly 10 and the friction of pin 72 to be discussed subsequently. If the high-pressure regulator 150 had malfunctioned, the pressure upstream of valve plug member 42 might be so great as to hold valve member 42 against its valve seat even against the force of return solenoid 30 and spring 46. This means that the high-pressure regulator 150 would have to be repaired first before the safety system can be reset, which is an additional safety feature of the present invention.

A valve plug detector 60 serves a dual purpose in that it not only activates close solenoid 26 but also activates the alarm indicators 90 when the valve plug member 42 is in a closed position. Detector 60 will further turn on solenoid 26 when the valve member 42 is forced against the valve seat 38 as will hereinafter become more readily apparent in reference to FIG. 9.

The detector 60 is located in the wall of body member 12 at a point in the valve assembly 10, see FIG. 2, where a detector pin 72 can extend a short distance into the axial passageway 36 just upstream from the valve seat 38.

Figure 9:
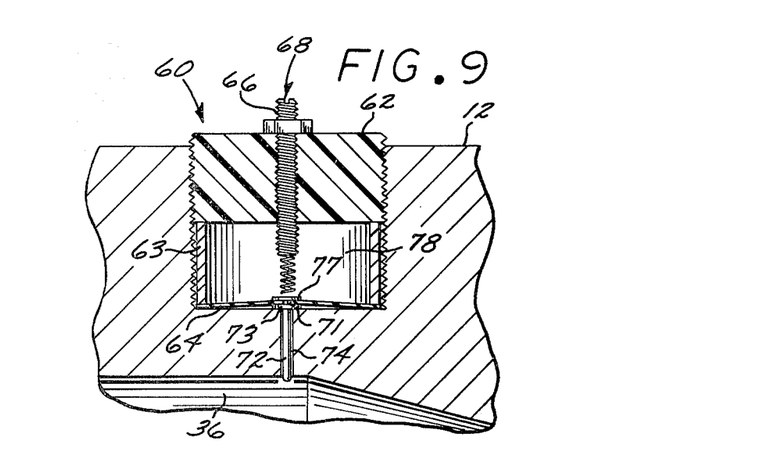
FIG. 9 is a cross-sectional view of a shutoff valve detector of the second automatic shutoff valve assembly.

Referring to FIG. 9, the detector 60 has a nonconducting cap 62 which screws into the wall of body member 12 and forces a metal sleeve 63, against a resilient and flexible diaphragm 64. The sleeve 63 clamps the flexible diaphragm 64 against the body member 12 so that the diaphragm hermetically seals the valve assembly 10 from any fuel leakage from passageway 36 into interior chamber 78 of detector 60. This hermetic seal further prevents an explosive condition due to fuel leaking into the interior chamber 78. The diaphragm 64 further exerts a downward spring force through pin 72 against the valve plug member 42 to help maintain its seated position.

A radially adjustable conducting pin 66 is screwed into the center of cap 62. By adjusting the pin 66 to different radial heights, the valve can be set to shut off at different fuel pressures within passageway 36 irrespective of any movement of valve plug member 42 because excess fuel pressure alone will tend to drive the diaphragm 64 upwards toward pin 66. Thus, a further safety feature is provided indicating an excessive pressure in the fluid line. For example, if the pressure regulator froze due to low temperature and moisture in the fluid, the sensed high pressure could close the automatic shutoff valve assembly 10. Pin 66 also acts as one electrode 66 for the valve detector 60. The detector 60 and electrode 66 are shown schematically in FIG. 1 as switch 60 and lead 66.

One end of the pin 66, external to the detector 60 has a screw bit 68 for radial adjustment of the pin height. The other end of the detector 60 has a spring 70 attached to it so that pin 66 will contact the pin 72 in a flexible manner. Spring 70 prevents the pin 66 from directly contacting with pin 72. An inflexible direct contact could interfere with valve plug member 42 during its movement toward valve seat 38.

Pin 72 is movably mounted in a shaft 74 located in a wall of housing body member 12 and is made of a non-conducting material such as plastic.

The pin 72 projects through a hole 71 in the center of the diaphragm 64. Just below hole 71, pin 72 has a flange 73 which is broader than shaft 74, and which thereby prevents pin 72 from falling into the passageway 36 of the valve assembly 10.

Above the pin flange 73, a helical thread (not shown) is provided so that a metallic nut 77 can be fastened. When nut 77 is screwed down to the fullest extent, it forces the diaphragm 64 against flange 73 of pin 72, thereby forming a hermetic seal to prevent fuel from leaking into the interior chamber 78 of the detector 60, and causing an electric contact to be made with a surface metallic coating (not shown) located on the top of diaphragm 64. The metallic coating extends to and contacts metal sleeve 63 which in turn is grounded to the valve assembly 10. Accordingly, nut 77 is in electrical contact with the valve assembly 10.

The metallic coating affixed to the interior surface of diaphragm 64 can be a Copper Print spray material sold by G.C.E. Electronics, Rockford, Ill. As an alternative to the metallic coating, a thin, flexible conductive metal strip or wire extending from the nut 77 to the valve assembly 10 can be used.

When diaphragm 64 is in its unflexed condition and when valve plug member 42 is in an open condition as shown in FIG. 2, pin 72 will extend a short distance into axial passageway 36 and the metallic 77 nut on its other end will be out of contact with spring 70. When the valve plug member 42 moves forward toward valve seat 38, it contacts pin 72 and forces it radially outward. When the valve plug member 42 is fully seated as shown in FIG. 3, the nut 77 on pin 72 contacts spring 70 and closes the electrical switch 60 by bringing the conducting pin 66 into electrical contact with the valve assembly 10.

When switch 60 is closed, the relay 81 is activated, which in turn, causes solenoid 26 to be activated. This will also cause warning lights 90 to be activated. FIG. 1 shows the relay 81 in an open condition.

Since pin 72 is movably mounted in shaft 74, fuel could leak up the shaft and into the detector chamber 78 were it not for the hermetic seal of diaphragm 64. Pin 72 is made of nonconducting material. Therefore, no fuel is in contact with any spark that might cross from nut 77 to spring 70 to possibly set off an explosion.

Because fuel will enter shaft 74, its pressure alone will tend to drive the diaphragm 64 upward. By adjusting pin 66 to different radial heights, the switch 60 can be designed to close at different fuel pressures within the valve assembly 10 irrespective of whether the valve plug member 42 is driven against the valve seat 38. Thus, even though there might not be sufficient pressure differential across the valve assembly 10 to cause valve member 42 to move, any preset excessive fuel pressure condition in the fuel line alone will cause the diaphragm 64 to flex upward so that nut 77 contacts spring 70 thereby closing switch 60 which, being in electrical series with solenoid 26 as shown in FIG. 1, will thereby cause solenoid 26 to force the valve plug member 42 against the valve seat 38.

An electrical power source for the system will usually be the direct current storage battery 50 of the recreational vehicle, which usually has its negative side grounded and its positive side leading via a bus to the various devices and switches within the recreational vehicle. The bus and grounds themselves, are not shown as they are well known in the prior art. The electrical circuit disclosed herein is, therefore, only a functional representation of an actual electrical system.

When switch 60 closes, the completed electrical circuit will light the warning lights 90 and operate the relay 81 (which could be optionally time delayed if desired) to activate the closing solenoid 26. These warning lights 90 can be disposed about the recreational vehicle at strategic locations; e.g., one can be placed in the driving compartment to alert the driver, another can be placed on the rear door to alert people entering the recreational vehicle's camper section, and still another might be placed in the camper section itself.

The smoke and gas detector 82, is an added safety feature of the safety system. When it detects smoke or gas fumes of the type mentioned above, i.e., carbon monoxide, propane gas fumes, smoke from fire and other oxidizable gases, etc., it generates a signal current pulse as shown by FIG. 1 to activate solenoid 26 to drive the valve plug member 42 against its valve seat 38 which, in turn, will cause the detector 60 to engage the warning lights in the safety system. It also activates audible alarm 91, which with the smoke and gas detector can be provided in one container represented by dotted lines 83. The audible alarm 91 will continue to sound so long as the smoke and gas detector 82 continues to detect the presence of the abnormal gas condition which set it off.

As mentioned earlier, the smoke and gas detector 82 is capable of generating an electrical output signal when a variation in a resistance across the sensor filament is detected. Basically, a regulated voltage is applied in series with the sensor filament and a measuring resistor (not shown). The measuring resistor can limit the current through the sensor. Variations in the sensor resistance due to the presence of a gas will cause a voltage variance at the junction of the sensor and the resistor. This voltage variation can be applied to a voltage follower to isolate the resistive measuring circuit. The output of the voltage follower is applied to a comparator circuit. A reference voltage can be developed across a series network consisting of a resistor and a potentiometer. When the signal voltage detected across the sensor exceeds the reference voltage, the comparator is driven high which, in turn can drive a transistor element to a conducting state to provide an output enabling signal.

To prevent an erroneous activation, for example, upon an initial lighting of a gas stove or transient cooking smoke, a time delay function (not shown) can be provided. An RC network having a predetermined time constant (DC) of, for example, 60 seconds can provide a voltage which is provided to the inverting junction of a start comparator. A reference voltage developed by the bias network on the noninverting junction holds the comparator in the ON condition until the signal voltage reaches this reference value, when the output will go low. The output of the comparator is fed to the trigger comparator inverting junction to inhibit the alarm during the first minute of operation.

A simple timing circuit 87, shown in FIG. 1, can limit the duration of the enabling signal applied to closing solenoid 26 to a predetermined duration. Thus, the actual duty cycle of the solenoid 26, can be controlled to prevent the accumulation of heat and damage to the solenoid coil.

Switch 84 represents a push button switch which must be manually depressed in order for it to operate. When this switch 84 is closed, solenoid 30 is engaged to drive the valve plug member 42 away from the valve seat 38 as shown in FIG. 2. This allows the valve assembly 10 to be reset if there are no abnormal conditions present. However, if any of the initial abnormal conditions are still present, the automatic valve assembly 10 will immediately shut itself off again when switch 84 is released. As can be seen, the shaft of solenoid 26 acts as a return limit for positioning the valve plug member 42 at an initial operative position.

More than one reset switch 84 can be provided in alternative embodiments of the present invention, for example, resets might be placed with each warning light 90.

One or more switches 86 are provided so that the entire electrical system can be turned off during storage of the vehicle to prevent battery drain. In a preferred embodiment, one on/off switch and an alarm light 90 is located in the drivers' compartment and another set at the vehicle entrance door. The smoke and gas detector 82 has been provided with a reactivation time delay of approximately one minute after having been deactivated by switch 86. Therefore, before entering the vehicle, a person entering can be cautioned by suitable signs at the door switch to turn on the electrical system and wait one minute. If any gas has built up in the vehicle due to slow line leakage or extinguished pilots, etc., the alarm signal 91 and alarm lights 90 will come on while at the same time, the solenoid 26 will close the valve member 42. This sequence of events will warn the operator not to enter until the source of the difficulties has been located and rectified.

It will be understood that even with the electrical system inactive, the automatic shutoff valve assembly 10 is still in operation.

Figures 4, 5, 6, 7, 8:
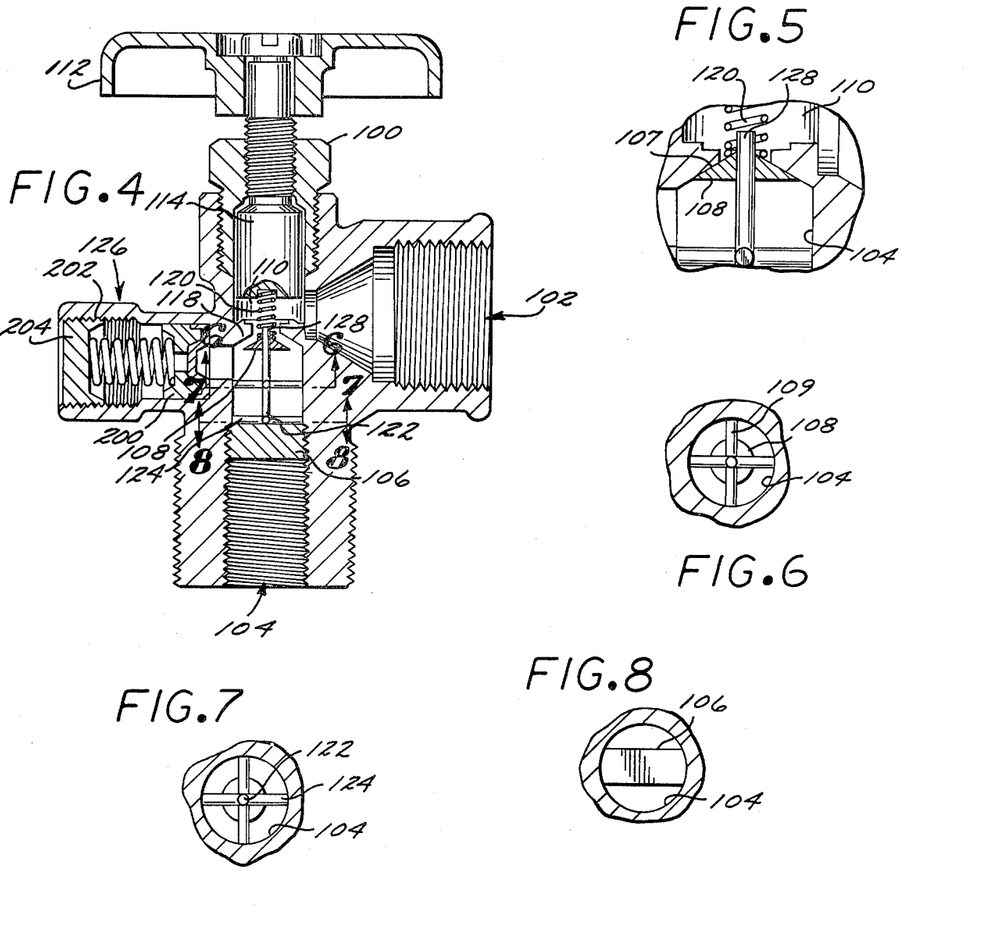
FIG. 4 is a cross-sectional view of the first automatic shutoff valve assembly with its valve member in an open position.
FIG. 5 is a partial cross-sectional view of the first automatic shutoff valve assembly disclosing the valve member seated against its valve seat.
FIG. 6 is a cross-sectional view of the first automatic valve member taken along plane 6—6 in FIG. 4.
FIG. 7 is a cross-sectional view of the first automatic valve member taken along plane 7—7 in FIG. 4.
FIG. 8 is a cross-sectional view of the first automatic valve member taken along plane 8—8 in FIG. 4.

The first automatic shutoff valve assembly 100 which is designed for attachment directly to the nozzle of the high-pressure fuel tank 140 before any connection to a downstream fuel line is shown in cross section in FIG.

4. By connecting this valve assembly 100 directly to the tank, an additional safety feature is realized. Thus, in case of a crash, and the high-pressure tank 140 is torn from the recreational vehicle, the automatic shutoff valve assembly 100 will go with the tank and not stay attached to the recreational vehicle and can shut off the high-pressure fuel tank 140 so that it will not spray highly flammable gas into the air near the scene of an accident.

Fuel from the high-pressure tank 140 enters valve assembly 100 via inlet port 104 and through a valve member retainer 106, which is more clearly shown in FIG. 8, as a cross-sectional view plane 8—8. This retainer 106 occupies only a diagonal portion of the circular cross-sectional passageway 104.

Referring again to FIG. 4, fuel will then flow into an alignment conduit occupied by guide stem 122 and a pair of lateral alignment struts 124 and 109. Referring to FIG. 7, which is a cross-sectional view from plane 7—7 in FIG. 4, the struts 124 can supplement thin wires or integral molded members extending out and contacting the walls of passageway 104. The purpose of guide stem 122 and the struts are to align valve plug member 108 within passageway 104 as valve plug member 108 moves up and down in passageway 104.

Valve plug member 108 is preferably made from a plastic, inert to the fuel, and is positioned in passageway 104. Alternatively, the valve plug member 108 can be a conventional metal member with a resilient O-ring. Valve plug member 108 is biased away from a valve seat 118 by spring 120.

The valve plug member 108 includes a mounting stem or stud portion 108 that supports the spring 120. The helical coil diameter of the spring 120 is dimensioned to prevent any interference with the proper seating of the valve plug member 108. The spring force generated is sufficient to incur that the valve plug member 108 is positioned in an open condition during normal fuel flow through an operative pressure regulator 150. Any excessively abnormal flow will create a sufficient pressure differential to close valve plug member 108.

Valve plug member 108 has a circular cross section as can be seen by referring to FIG. 6, which is a cross-sectional view from plane 6—6. The valve plug member 108 occupies a central space in passageway 104, and has four lateral extensions 109 which interface with the wall of passageway 104. This arrangement allows fuel to flow pass the lower portion of valve member 108 in its open condition while still permitting the upper portion of valve plug member 108 to be guided and seated properly with its valve seat 118 as shown in FIG. 5.

Mounted adjacent the valve plug member 108 in a supplemental high-pressure relief valve 126 having unrestricted flow communication with the fuel in the tank 140. The valve 126 is a conventional relief valve designed to open and allow fuel to escape when the pressure in the tank 140 becomes excessive. Therefore, if the recreational vehicle catches on fire and the automatic valve assembly 100 has closed, the tank 140 still will not explode because of intermittent pressure relief by relief valve 126. The relief valve 126 includes a valving member 200 and a spring 202 to bias it to a closed position. A mounting plug 204 can be adjustably mounted to seat the spring 202 and provide a variable closing force.

Fuel flows by the valve plug member 108, past valve seat 118, and into chamber 110. From there fuel will flow into the recreation vehicle's fuel line through port 102 which can have a conventional type of coupling to couple the valve assembly 100 to the recreation vehicle's fuel line.

When pressure downstream from port 102 suddenly drops, such as when the high-pressure tank 140 is torn from the recreation vehicle in a collision or when the fuel line ruptures or possibly even when the high-pressure regulator 150 malfunctions, a pressure differential will develop across the valve plug member 108 which will overcome the resistance of spring 120 to cause the valve plug member 108 to be forced against its valve seat 118, thus closing the valve assembly 100 as shown in FIG. 5. The valve assembly 100 must be manually reset.

After the malfunction has been dealt with, the automatic valve assembly 100 can easily be reset by closing valve member 114, which can further function as an on/off valve for the high-pressure fuel tank 140. Reset is accomplished because the valve stem 128 can protrude into chamber 110 when valve plug member 108 is seated against its valve seat 118 as shown in FIG. 5. When handle 112 is turned to gradually lower valve member 114 into chamber 110, valve member 114 will contact the stem extension 128 and will force valve plug member 108 away from its valve seat 118. This will allow fuel to enter chamber 110 and from there flow into the fuel line. If the malfunction has been repaired, the fuel pressure in chamber 110 will quickly equalize with the fuel pressure in the tank 140 and spring 120 will force valve plug member 108 away from its valve seat 118 to effectively reset the automatic valve assembly 100. Thus, the high-pressure tank 140 is provided with an on/off valve 114 which can act as a reset for the automatic shutoff valve assembly 100.

An alternative arrangement (not shown) is to have the extension 128 appended downward from the lower portion of valve member 114 instead of upward on valve plug member 108 so that when valve member 114 is moved into chamber 110, the stem extension 128 would drive valve plug member 108 away from its valve seat 118 as described above.

An additional novel feature exists in having a pair of automatic shutoff valves in the recreational vehicle's safety system as above described. The high-pressure automatic shutoff assembly valve 100 is generally adjusted to be relatively insensitive to occasional drops in pressure because it must be designed to permit fluctuations during the operation of the high-pressure regulator 150. However, the second automatic valve assembly 10 located downstream from the high-pressure regulator 150 can be very sensitive to the high-pressure. The valve assembly 10 will close first if the high pressure regulator 150 ever malfunctions, even if the high-pressure automatic valve assembly 100 does not close. Furthermore, when the second automatic valve assembly 10 has closed, it will activate the warning signals to indicate that the high-pressure regulator has malfunctioned. If only the first automatic valve assembly 100 were to close, no such warning signals would be given. Also, if the high-pressure regulator 150 can be repaired without disconnecting it from the fuel line, the safety system can be simply reset by a mere press of the reset button 84 instead of having to hand crank the manual reset 112 on the first automatic valve assembly 100.

Many modifications may be introduced into the preferred embodiment discussed above without the departing from the spirit and scope of the invention. Therefore, it is to be understood that within the scope of the appended claims the invention may be practiced other than as specifically described above.

Therefore, in light of the above detailed description of the preferred embodiment, I claim:

1. In a recreational vehicle having a cabin, at least one appliance, a high-pressure fuel tank to supply fuel to said appliance, a fuel line interconnecting the fuel tank with said appliance and a high-pressure regulator located in the fuel line between the fuel tank and said appliance the improvement including a safety system comprising;

a first automatic valve means coupled directly to said high-pressure fuel tank for shutting off the flow of fuel from said high-pressure fuel tank when a predetermined drop in fuel pressure occurs downstream from said first automatic valve means;

a second automatic valve means coupled to said fuel line downstream from said high-pressure regulator for shutting off the flow of fuel in said fuel line when a predetermined pressure differential occurs across said second automatic valve member;

electrical means for resetting said second automatic valve means, and means for indicating when said second automatic valve means has shut off the flow of fuel in said fuel line.

2. The invention of claim 1 further including;

means for manually shutting off the flow of fuel from said high-pressure fuel tank, and means for resetting said first automatic valve means when said manual shutoff means is activated.

3. The invention of claim 2 further including pressure relief means for allowing fuel to escape from said high-pressure tank after it has been shut off by said first automatic valve means when pressure in said high-pressure tank increases to a predetermined pressure.

4. The invention of claim 1 further including means for holding said second automatic valve means closed until intentionally reset.

5. The invention of claim 1 further including at least one warning light actuated by said indicator means when said second automatic valve means shuts off the flow of fuel.

6. The invention of claim 1 further including at least one audible alarm actuated by said indicator means when said second automatic valve means shuts off the flow of fuel.

7. In a recreational vehicle having a housing, at least one appliance, a fuel tank to supply fuel to said appliance, a fuel line interconnecting the fuel tank with said appliance, and a pressure regulator connector to the fuel line, the improvement comprising a recreation vehicle safety system having;

a smoke and gas detector mounted inside the housing of the recreational vehicle for indicating the presence of at least one of a gas or smoke condition within the housing, and means operatively connected to the smoke and gas detector, to shut off the flow of fuel in said fuel line when said smoke and gas detector indicates the presence of a predetermined amount of an oxidizable gas in the recreation vehicle including an electrical power source operatively connected to the smoke and gas detector so that the said detector electrically signals the presence of a predetermined amount of an oxidizable gas and wherein the means to shut off the flow of fuel further includes a valve assembly having;

a housing member with an interior passageway interconnected to said fuel line;

a valve seat through which the fuel must flow mounted in the interior of said housing member;

a valve member mounted in the interior of said housing member and upstream from said valve seat;

means for biasing said valve member to an open position upstream from said valve seat including a first solenoid assembly operatively connected with said valve member and electrically connected with said smoke and gas detector and said power source such that when said smoke and gas detector signals the presence of an oxidizable gas, said first solenoid is actuated so that said valve member closes against said valve seat, thereby shutting off the flow of fuel in said fuel line, and means to permit said valve member to be closed against said valve seat when a predetermined pressure differential develops between the upstream and downstream ends of said housing member.

8. The invention of claim 7 further including at least one warning light and means for activating said warning light when said solenoid assembly shuts off the flow of fuel in said fuel line.

9. The invention of claim 8 further including a switch electrically connected to said electrical power source, a second solenoid electrically connected to said switch and said power source and operatively connected to said valve member so that when said switch is closed, said second solenoid assembly drives said valve member away from its valve seat.

10. The invention of claim 7 further including at least one audible alarm and means for activating said audible alarm when said shutoff means shuts off the flow of fuel in said fuel line.

11. The invention of claim 7 further including means for resetting said solenoid assembly to allow fuel to flow in said fuel line.

12. The inventionl of claim 7 wherein said biasing means comprises a spring operatively connected to said valve member.

13. The invention of claim 7 wherein said means to permit said valve member to be closed against said valve seat when a predetermined pressure differential exists includes a valve member mounting means for guiding said valve member to said valve seat and for allowing fuel to flow around said valve member until said valve member is seated on said valve seat.

14. The invention of claim 7 further including a valve shut detector means for detecting when said first solenoid assembly has shut off the flow of fuel in said fuel line.

15. In a recreational vehicle having a housing, at least one appliance, a fuel tank to supply fuel to said appliance, a fuel line interconnecting the fuel tank with said appliance, and a pressure regulator connector to the fuel line, the improvement comprising a recreation vehicle safety system having;

a smoke and gas detector mounted inside the housing of the recreational vehicle for indicating the presence of at least one of a gas or smoke condition within the housing, and means operatively connected to the smoke and gas detector, to shut off the flow of fuel in said fuel line when said smoke and gas detector indicates the presence of a predetermined amount of an oxidizable gas in the recreation vehicle including an electrical power source operatively connected to the smoke and gas detector so that the said detector electrically signals the presence of a predetermined amount of an oxidizable gas and wherein the means to shut off the flow of fuel further includes a valve assembly having;

a housing member with an interior passageway interconnected to said fuel line;

a valve seat through which the fuel must flow mounted in the interior of said housing member;

a valve member mounted in the interior of said housing member and upstream from said valve seat;

means for biasing said valve member to an open position upstream from said valve seat including a first solenoid assembly operatively connected with said valve member and electrically connected with said smoke and gas detector and said power source such that when said smoke and gas detector signals the presence of an oxidizable gas, said first solenoid is activated so that said valve member closes against said valve seat, thereby shutting off the flow of fuel in said fuel line; a switch electrically connected to said electrical power source, and a second solenoid electrically connected to said switch and said power source and operatively connected to said valve member so that when said switch is closed, said second solenoid assembly drives said valve member away from its valve seat.

16. The invention of claim 15 wherein said valve member is made of resilient material.

17. The invention of claim 15 further including means actuated by said switch for causing said first solenoid assembly to force said valve member against said valve seat.

18. The invention of claim 15 further including at least one warning light and means activated by said switch to light said warning light.

19. The invention of claim 15 further including at least one audible alarm and means actuated by said valve shutoff detector for sounding said audible alarm.

20. In a recreational vehicle having a housing, at least one appliance, a fuel tank to supply fuel to said appliance, a fuel line interconnecting the fuel tank with said appliance, and a pressure regulator connector to the fuel line, the improvement comprising a recreation vehicle safety system having;

a smoke and gas detector mounted inside the housing of the recreational vehicle for indicating the presence of at least one of a gas or smoke condition within the housing, and means operatively connected to the smoke and gas detector, to shut off the flow of fuel in said fuel line when said smoke and gas detector indicates the presence of a predetermined amount of an oxidizable gas in the recreation vehicle including an electrical power source operatively connected to the smoke and gas detector so that the said detector electrically signals the presence of a predetermined amount of an oxidizable gas and wherein the means to shut off the flow of fuel further includes a valve assembly having;

a housing member with an interior passageway interconnected to said fuel line;

a valve seat through which the fuel must flow mounted in the interior of said housing member;

a valve member mounted in the interior of said housing member and upstream from said valve seat;

means for biasing said valve member to an open position upstream from said valve seat including a first solenoid assembly operatively connected with said valve member and electrically connected with said smoke and gas detector and said power source such that when said smoke and gas detector signals the presence of an oxidizable gas, said first solenoid is activated said valve member closes against said valve seat, thereby shutting off the flow of fuel in said fuel line;

a shaft mounted in the wall of said housing member;

a nonconducting pin movably mounted in said shaft such that a first end extends into said interior passageway so that said valve member contacts the first end of said pin and forces it radially outward along said shaft;

a flexible diaphragm connected to the nonconducting pin;

a metallic coating affixed to a side of said diaphragm and providing electrical contact with said housing member, and an adjustable conducting pin mounted above said diaphragm such that when said valve member forces said nonconducting pin radially outward, said pin forces said diaphragm radially outward to contact said conducting pin, thereby bringing said housing member into electrical contact with said conducting pin to indicate the closing of the valve member.

21. The invention of claim 20 further including a conducting spring attached to the contact end of said conducting pin.

22. The invention of claim 20 wherein said diaphragm is mounted to independently flex outward to contact said conducting pin when a predetermined fuel pressure exists in the interior passageway of said housing member, and means responsive to same to cause said first solenoid to force said valve member against said valve seat.

23. A safety system for the detection of gases and the control of fuel from a supply source of the type used in recreational vehicles, comprising:

a smoke and gas detector capable of being mounted inside the housing of the recreational vehicle for indicating the presence of at least one of a gas or smoke condition within the housing with a first electrical signal;

valve means operatively connected to the smoke and gas detector, to shut off the flow of fuel in said fuel line in response to said first electrical signal from said smoke and gas detector indicating the presence of a predetermined amount of an oxidizable gas in the recreational vehicle;

pressure indicator means operatively connected to said valve means and to said fuel line to monitor and generate a second electrical signal indicative of the existence of fuel pressure beyond a predetermined limit, said valve means also responsive to said second electrical signal to shut off the flow of fuel and electrical means for resetting said valve means to a flow condition.

24. The invention of claim 23 wherein said valve means further includes a valve seat, a valve member and at least one solenoid assembly operatively connected with said valve member to control its position relative to said valve seat.

25. The invention of claim 23 further including at least one warning light activated by any one of the smoke and gas detector and the pressure indicator means whereby a fuel leak or an overpressure condition is indicated.

26. The invention of claim 25 further including an audible alarm activated by any one of the smoke and gas detector and the pressure indicator means.

27. A safety system for the detection of gases and the control of fuel from a supply source of the type used in recreational vehicles, comprising:

a smoke and gas detector capable of being mounted inside the housing of the recreational vehicle for indicating the presence of at least one of a gas or smoke condition within the housing with a first electrical signal;

valve means operatively connected to the smoke and gas detector, to shut off the flow of fuel in said fuel line in response to said first electrical signal from said smoke and gas detector indicating the presence of a predetermined amount of an oxidizable gas in the recreational vehicle; and pressure indicator means operatively connected to said valve means and to said fuel line to monitor and generate a second electrical signal indicative of the existence of fuel pressure beyond a predetermined limit, said valve means also responsive to said second electrical signal to shut off the flow of fuel, the pressure indicator means including, a pressure responsive diaphragm, a switch assembly operatively connected to the diaphragm and an adjustable pin member for controlling the amount of diaphragm displacement that is necessary before closing of the switch assembly.

* * * * *